June 27, 1967  C. VATTUONE  3,327,317
WELDER'S MASK PROVIDED WITH SERVO MOTOR-CONTROLLED
MOVABLE BLACKENED GLASS PLATE
Filed April 29, 1965  2 Sheets-Sheet 2
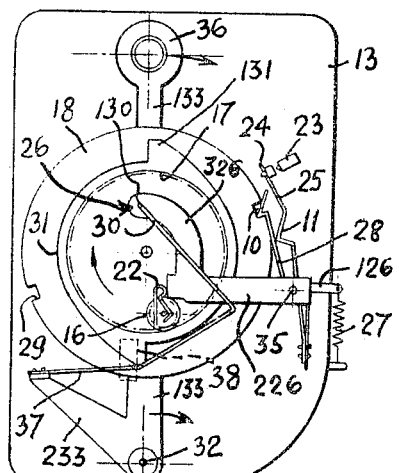
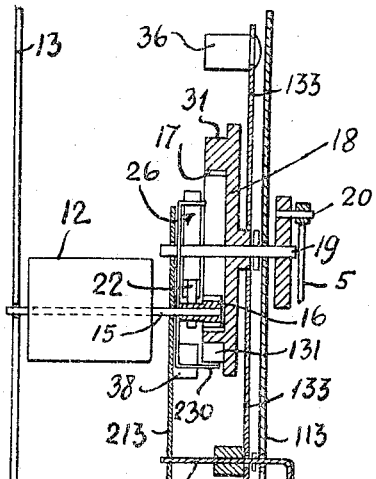
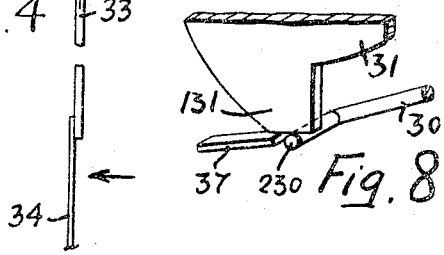
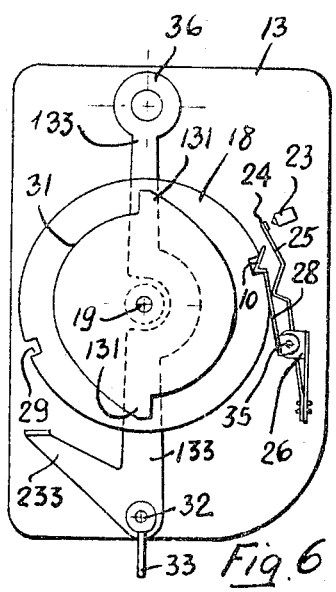
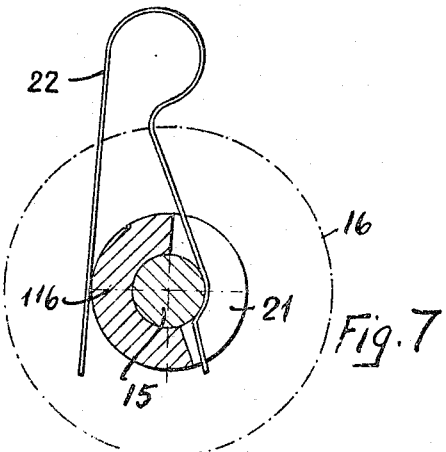
Inventor
COSTANTINO VATTUONE
By Emerie & Smiley
Attorneys

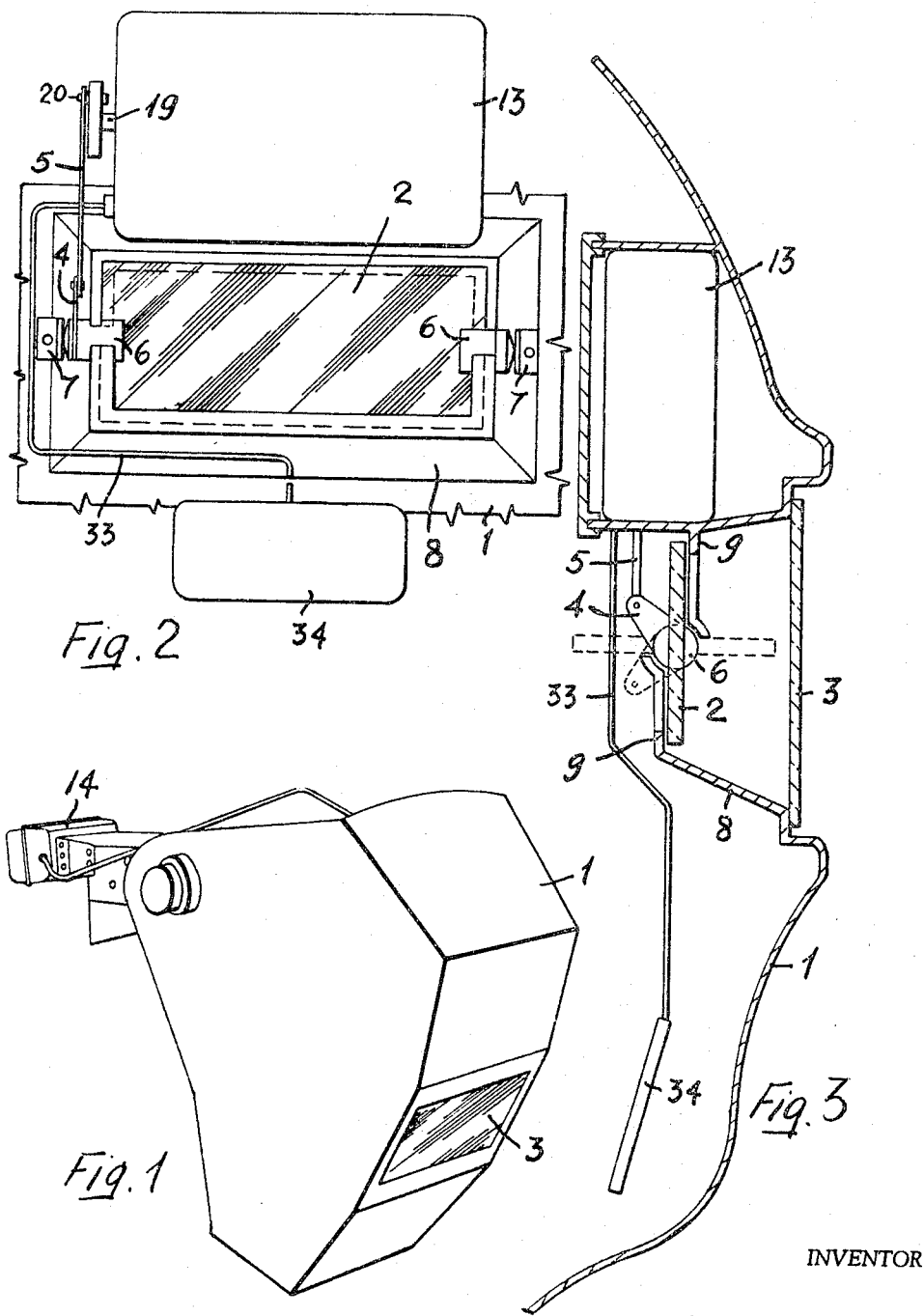

United States Patent Office 3,327,317
Patented June 27, 1967

3,327,317
WELDER'S MASK PROVIDED WITH SERVO MOTOR-CONTROLLED MOVABLE BLACKENED GLASS PLATE
Costantino Vattuone, 4 Via Aurelia,
Sestri Levante, Italy
Filed Apr. 29, 1965, Ser. No. 451,703
Claims priority, application Italy, May 4, 1964,
9,805/64
2 Claims. (Cl. 2—8)

This invention relates to welder's masks and aims to provide a mask of the kind which is self-supported on the welder's head and is provided with a shiftable black glass plate or screen which is so mounted, that when the mask is worn by the welder, the black glass plate may be shifted at will from a working position, in which it comes in front of the welder's eyes, thus protecting his eyesight from the dazzling welding light, to a rest position, in which it disposes itself so as not to intercept the eyesight and to permit of looking att the exterior without having the eyesight intercepted by a very strongly blackened glass.

A further object of the invention is to provide means for controlling the position of said black glass plate (this term including any eyesight-protecting screen, usually made of special very deeply blackened glass, or even of plastic material or other very deeply colored transparent matters) by very simple and reliable means, without necessity of employing a hand control.

Another object of the invention is to provide means for shifting said black glass plate from one position to another by a servo-motor driven device, whereby the starting of the servo-motor may be readily and reliably effected by a very weak control force, such as a welder's breath puff, or a weak air blow against a very light vane disposed in the mask before the welder's mouth.

Other objects and advantages of the invention will be apparent from the following specification of a preferred embodiment of the invention, in which the black glass is hinged in balance position and the control of same is effected by blowing air against a vane.

The said embodiment of the invention is shown by way of non-limiting example in the accompanying drawings, in which:

FIGURE 1 shows in perspective view a welder's mask of the type in which the present invention is embodied;

FIGURE 2 is a front elevation of the hinged black glass and adjoining mask parts;

FIGURE 3 is a vertical cross section through the black glass and adjoining mask parts;

FIGURES 4, 5 and 6 illustrate a servo-motor driven mechanism and a breath puff or weak air blow control therefor and FIGURES 7 and 8 are enlarged details of the mechanism shown in FIGURE 4.

One of the preferred forms of mask to which the invention may be fitted, is clearly shown in FIGURES 1 to 3.

As may be seen from FIGURE 1, the mask is of the kind adapted to be supported by the welder's head or shoulders, so as to free his hands for performing his work and comprises an outer housing 1 having a window closed by a clear protective glass plate 3 inserted in a box-like frame 8 to the inner side of which the black glass plate or screen 2 is mounted on a pair of co-axial hinge blocks 6 or other movable hinge members between a pair of co-axial fixed hinge members 7, as clearly shown in FIGURE 2. The black glass plate 2 is thus mounted to pivot on said fixed members 7 by at least 90°, thus assuming two positions at right angles, as clearly shown by full lines and dash lines in FIGURE 3. To one of the rotatable hinge blocks 6 a lever arm 4 is fastened, preferably at 45° with respect to the plane of the movable glass plate 2. To the end of this lever arm 4 a connecting rod 5 is hinged, which is operated by the means to be presently described whenever it is desired to rock the plate 3 from the vertical working position (i.e. the position parallel to fixed plate 3), in which plate 2 abuts against a pair of abutment flaps 9 of frame 8 to the horizontal or rest position, indicated in FIGURE 3 by full lines and dash lines, respectively.

In order to readily and securely shift plate 2 from either of these two positions to the other one, under a very light control, such as the welder's breath puff or a like air blow, an electric servo motor-driven mechanism has been devised which, when the motor is energized by closing its circuit, effects the reciprocation of said connecting rod 5 so as to rock lever arm 4 and the blackened glass plate 2 movable therewith by 90°.

In the preferred embodiment as shown in FIGURES 2 through 8 of the drawings, said mechanism is arranged in a box 13 mounted within the mask and comprises a small electric motor 12 having a shaft 15 rotatably supported by said box 13 and to which current may be fed by an electric battery housed within a casing 14, FIGURE 1, fastened to the mask 1.

Upon the driving end of motor shaft 15 a pinion 16 is mounted through a friction joint which may be of any conventional construction, but which, in the example as shown in FIGURES 4 and 7, is constructed by providing said pinion 16 with a hub 116 having a slit 21 into which there may be inserted one leg of a hairpin-like spring 22 which may be pushed with force against the adjoining motor shaft 15, while the other pin leg adheres against the periphery of the pinion hub 116.

Pinion 16 meshes with an internal gear crown 17 provided inside a ratchet flange 31 of a disc 18 fastened on to a shaft 19. The outer periphery of said ratchet flange 31 is provided with two diametrically opposite ratchet teeth 131 on which may ride and between which may snap a stirrup-like pawl 30 which is so mounted as to permit the (in the example clockwise) rotation of shaft 19 together with ratchet flange 31 and disc 18 until the motor 12 is energized in the right direction. Shaft 19 is rotatably mounted between a pair of parallel plates 113–213 integral of or fastened to the fixed walls of box 13 and projects with one of its ends to the exterior of said box 13 on one side thereof (the left-hand side in FIGURE 2). On this end, shaft 19 is provided with a crank 20 to which the blackened glass plate-controlling rod 5 is hinged, the other end of which is hinged to lever arm 4 integral of rockable glass plate 2.

In order to permit of starting the motor 12 whenever required, by means of a welder's breath puff or other minimum trigger force, and to stop the same motor when the shaft 19 has been rotated by 180°, the following arrangement has been devised:

The motor 12 receives the current from the battery in casing 14 through a pair of wires (not shown) and across a switch including a fixed contact 23 and a movable contact 24 carried by spring blade 25. Blade 25 has a tooth 11 and is fastened, together with another spring blade 28 also provided with a tooth 10 upon a fixed pin 35 so as to lie in front of disc 18. Said teeth 11 and 10 serve as abutment members and both blades 25 and 28 are fastened to a rotatable pin 35 in such a position with respect to each other and to the fixed contact 23 that, when blade 28 is not pushed towards blade 25, the contacts 23 and 24 are open and the motor 12 is stopped. This condition is fulfilled when tooth 10 snaps into one of two diametrically opposite notches 29 of discs 18, as clearly shown in FIGURES 4 and 6 when, on the contrary, pin 35 is rotated so as to swing blades 28 and 25 in clockwise direction, tooth 10 comes out of one of the notches 29 and contact 24 comes into contact with 23, thus starting the motor 12 and promoting the rotation of disc 18. Due to this rotation, the notches 29 come away from tooth 10, which thus rides on the periphery of the rotating disc 18 and, through tooth 11 of blade 25, maintains this latter with contact 24 urged against contact 23. Thus the motor continues its rotation until the disc 18, by rotating, comes with one of its notches 29 in correspondence of tooth 10, which thus snaps thereinto and permits the elastic back swinging of blade 25, the opening of the contacts 24–23 and the consequent stopping of motor 12.

In order to swing said blades 25–28 towards and away from contact 23, the following breath puff-controlled trigger mechanism is provided.

Upon the rotatable fulcrum pin 35 a double-armed lever 26 is fastened which comprises a first lever arm 126 urged by a spring 27 to swing so as to urge blades 25 and 28, fastened to pin 35, in the direction of fixed contact 23. The second arm of lever 26 comprises a straight section 226 and a curved neck section 326. The said straight section 226 ends with a heel portion abutting against the neck of hairpin spring 22 so as to press the corresponding spring leg against the uncovered section of motor shaft 15. To the end of the said neck section 326 an angle stirrup-like pawl 30 in hinged at 130, while its opposite end 230 rides over the periphery of ratchet 31. The just-described parts are so dimensioned and mounted that, when the mechanism is in rest position, as shown, the transverse bar of said stirrup-like pawl 30 is urged against the ridge of one of the ratchet teeth 131 and prevents any clockwise swinging of lever 26 under the pull of spring 27.

In order to permit said clockwise swinging at will of the welder, the breath puff-controlled trigger mechanism, now to be described, is provided.

Said trigger mechanism comprises a double-armed lever 33–133 fulcrumed at 32 and carrying at its lower end a control vane 34 which comes to lie in front of the mask wearer's mouth (see FIGURE 3) and at its top end a balance weight 36. The upper lever arm 133 is provided with an inclined branch 233 on the end of which a trigger blade 37 is fastened, whose free end lies in front of the transverse bar of stirrup 30.

The operation is apparent:

By blowing against vane 34 in the direction of the arrow, lever 33–133–233, is swung in clockwise direction and thus the end of trigger blade 37 pushes the transverse bar 230 of stirrup 30 inside the vertical section of the ratchet 131 and at the same time permits of spring 27 urging the lever 26 to rotate in clockwise direction together with pivot 35 and blades 25 and 28 attached thereto. Thus tooth 10 comes out of notch 29, contact 24 abuts against contact 23 and the motor 12 is started and disc 18 is rotated until tooth 10 snaps into another notch 29, the contacts 23–24 are opened and the motor 12 de-energized. In the embodiment as shown, this happens after a 180° revolution of disc 18. By effecting this half turn, crank 20 is shifted from its top to bottom position, and vice versa and the blackened glass plate 2 is rotated by 90°, as aforesaid.

During the rotation of disc 18, a fixed abutment 38 prevents the stirrup-like pawl 30 from being entrained into rotation.

I claim:

1. A welder's mask fitted over the head, the mask comprising:
   a movable protective plate hinged to the mask adjacent a viewing opening therein;
   means, including a motor, to effect shifting of the plate from a position intercepting the wearer's vision to a rest position out of the field of vision;
   means for automatically stopping the shifting of the plate in either of said positions; and
   trigger means for actuation of the motor, the trigger means including a vane proximal to the wearer's mouth and movable by the application of a puff of breath thereagainst to energize the mottor.

2. A welder's mask adapted to be fitted over the head comprising:
   a movable blackened glass plate, the plate being shiftable from a working position in which it is disposed to intercept the vision forwardly of the welder's eyes, to a rest position in which it is shifted out of the field of vision;
   an electric servo-motor to effect said shifting;
   the mask having a viewing opening therein;
   means mounting the blackened glass plate for movement relative to the viewing opening;
   means for automatically stopping the shifting of the plate when either the working or rest position is reached;
   trigger means for starting the motor, said trigger means being actuated by a small force;
   the glass plate being hinged to the mask on rotatable hinge members;
   at least one of the hinge members having a lever arm and a crank arm thereon, the lever arm being arranged at an angle of substantially 45° relative to the plane of the plate, the motor, at each operation, shifting the crank arm from a topmost to a lowermost position, and the reverse;
   the crank arm being shiftable from one end position to another end position and being revolvable through substantially 180°;
   a rigid rod connecting the lever arm and crank arm in a manner such that, when the crank arm is shifted from either of its end positions, the plate rotates through an angle of substantially 90°;
   the trigger means, including a starting switch having contacts operated by a notched operating disc, and further including a vertical balance lever carrying at one end a vane being proximal to the user's mouth and carrying a balance weight at its opposite end;
   means for holding the starting switch in open position and for closing the switch, the means including a pawl-like member;
   the balance lever being swingable responsive to direction of a puff of breath against said vane;
   a push member integrally connected on said balance lever and facing the pawl-like member, the pawl-like member being pushed by the push member; and
   means for automatically opening the switch after a predetermined angle of rotation of said notched disk.

References Cited

UNITED STATES PATENTS

| | | | |
|---|---|---|---|
| 2,036,224 | 4/1936 | Lincoln et al. | 2—8 |
| 2,171,052 | 8/1936 | Tatter | 2—8 |
| 2,417,883 | 3/1947 | Oschin | 2—8 X |
| 2,569,715 | 10/1951 | Green | 2—8 |
| 2,762,048 | 9/1956 | Modin | 2—8 |
| 3,159,844 | 12/1964 | Haboush | 2—8 |

FOREIGN PATENTS 245,439  7/1947  Switzerland.

JORDAN FRANKLIN, *Primary Examiner.*

J. R. BOLER, *Assistant Examiner.*